United States Patent [19]

Dieter

[11] Patent Number: 4,483,042
[45] Date of Patent: Nov. 20, 1984

[54] LOCKING DEVICE FOR TRAILING WHEELS OF A WHEELED CARRIAGE

[75] Inventor: Gläser Dieter, Munich, Fed. Rep. of Germany

[73] Assignee: Peg Perego-Pines Deutschland GmbH, Munich, Del.X

[21] Appl. No.: 420,809

[22] Filed: Sep. 21, 1982

[30] Foreign Application Priority Data

Sep. 21, 1981 [DE] Fed. Rep. of Germany ....... 3137433

[51] Int. Cl.$^3$ .............................................. B60B 33/02
[52] U.S. Cl. ........................................ 16/35 R; 16/38
[58] Field of Search ..................... 16/35 R, 48, 38, 45, 16/46, 47, 20, 23, 25, 28, 37

[56] References Cited

U.S. PATENT DOCUMENTS

| 740,267 | 9/1903 | Gamble | 16/35 R |
| 1,555,839 | 10/1925 | Fries et al. | 16/35 R |
| 2,434,863 | 1/1948 | Parkhill | 16/35 R |
| 3,636,586 | 1/1972 | Bollinger | 16/35 R |

Primary Examiner—Fred Andrew Silverberg
Attorney, Agent, or Firm—Finnegan, Henderson, Farabow, Garrett & Dunner

[57] ABSTRACT

A locking device for locking the trailing wheels of a wheeled carriage, particularly of a perambulator, in the straight running position, the trailing wheels being mounted for pivotal movement about an upright axis extending perpendicular to their axis of rotation without intersecting it, wherein a support member carrying the axis of rotation of the trailing wheel is connected to a vertically extending sleeve mounted for rotation about its vertical axis in a concentrically surrounding cylindrical recess in the wheeled carriage, and wherein a resiliently deformable plug extends through the sleeve from above, the plug having a disk-shaped enlarged head portion engaging the rim of the upper end face of the recess and being in positive locking engagement with the sleeve so that the plug is non-rotatably connected therewith, the locking device including a substantially vertically extending engagement surface formed on the disk-shaped head portion for positive locking engagement with a locking member pivotally mounted on the wheeled carriage in the locking position thereof.

5 Claims, 2 Drawing Figures

LOCKING DEVICE FOR TRAILING WHEELS OF A WHEELED CARRIAGE

This invention relates to a device for locking the trailing wheels of a wheeled carriage.

In the case of wheeled carriages equipped with trailing wheels, for instance wheeled frames of perambulators, at least the forward trailing wheels are mounted on the frame for pivotal movement about their vertical axes so as to facilitate the steering movements of the carriage, particularly for negotiating very close curves.

The stationary condition of the carriage, particularly a stationary condition at a fixed location with the aid of locking brakes, can be reliably ensured only if the pivotably mounted trailing wheels are locked in a predetermined position, preferably in their straight-running position. This locking of the trailing wheels in their straight-running position is of particular importance in the case of the wheeled frame of an infant's carriage or perambulator, as a child occupying the perambulator might by its see-saw movements cause the carriage to turn around the wheels to which the locking brakes are applied, resulting in the danger of the perambulator tipping over in the case for instance of a sloping ground surface.

SUMMARY OF THE INVENTION

It is therefore an object of the invention to provide a locking device for the trailing wheels of a wheeled carriage, which is of simple construction, reliable operation and readily operable.

This object is attained by providing in a locking device for locking the trailing wheels of a wheeled carriage in the straight running position, wherein the trailing wheels have an axis of rotation and are mounted for pivotal steering movement about a vertical axis extending perpendicular to the axis of rotation, but not intersecting it, wherein a support member carrying the axis of rotation of the trailing wheels is connected to a vertically extending sleeve mounted for rotation about the vertical axis in a concentrically surrounding cylindrical recess in the wheeled carriage, and wherein a resiliently deformable plug, extending through the recess from above and having a disk-shaped enlarged head portion engaging the rim of the upper end face of the recess, is non-rotatably connected to the sleeve, the improvement comprising a substantially vertically extending engagement surface formed on the disk-shaped head portion of the plug and a locking member pivotally mounted on the wheeled carriage for positive locking engagement with the engagement surface to thereby lock the wheel against pivotal movement about the vertical axis.

In a wheeled carriage of the type defined above, in which the trailing wheels are pivotably mounted on the wheeled carriage, the locking device is formed in a structurally simple and thus inexpensive manner by the vertical engagement surface integrally formed with the disk-shaped head portion of the plug and an associated locking member mounted on the carriage adjacent the engagement surface for pivotal movement into and out of a locking position, in which it is in engagement with the vertical engagement surface so as to prevent the plug, and thus the sleeve non-rotatably connected thereto, from rotating. This results in the trailing wheels, which are mounted for pivotal movement about an upright axis, being locked in the straight-running position of the carriage in a particularly simple manner.

According to the further developments of the invention, the two members of the locking device are formed as injection-moulded components, with the engagement surface being formed in a structurally simple and thus inexpensive manner as an integral part of the plug provided for the pivotal mounting of the trailing wheels.

An embodiment of the invention shall now be described with reference to the accompanying drawings, in which:

DESCRIPTION OF THE PREFERRED EMBODIMENT

Figure 1:
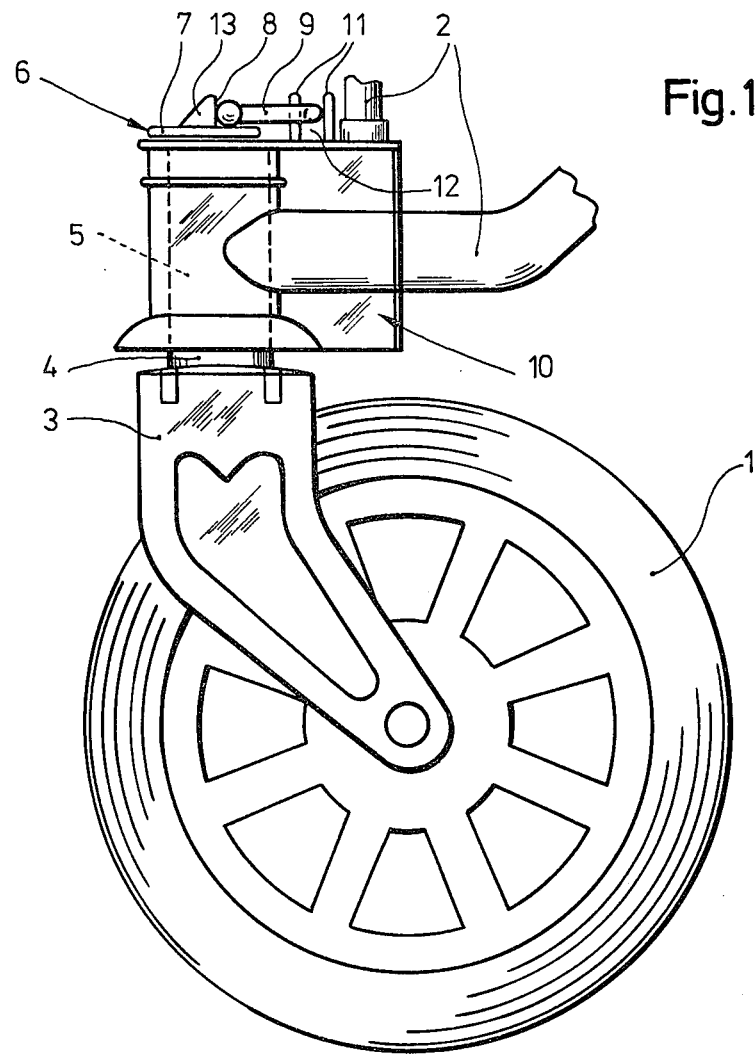
FIG. 1 shows an elevational side view of a trailing wheel in combination with the locking device.

Shown in FIG. 1 is a trailing wheel 1 mounted on a wheeled carriage 2 for pivotal movement about an upright axis by means of a support member 3, in which wheel 1 is rotatably mounted about its axis. FIG. 1 shows only the end portions of two struts of carriage 2, to which a suitably formed injection-moulded member 10 is attached. Support member 3 may be formed in the shape of a fork and is connected to a substantially vertically extending sleeve 4. Sleeve 4 extends into a cylindrical recess 5 in injection-moulded member 10, in which it may be supported by ball bearings (not shown) for low-resistance rotation about the upright axis. For securing sleeve 4 and thus support member 3 to injection-moulded member 10 there is provided an only partially shown plug 6 having an enlarged disk-shaped head portion 7 at its upper end. After sleeve 4 has been inserted into cylindrical recess 5, plug 6, which is of a resiliently deformable material, is introduced into sleeve 4 from above until a resiliently expandable lower end portion (not shown) of plug 6 engages the lower rim of sleeve 4. As disk-shaped head portion 7 is in engagement with the upper rim of cylindrical recess 5 of injection-moulded member 10, sleeve 4 is thus retained within injection-moulded member 10 and prevented from dropping out of cylindrical recess 5. The resilient expansion capability of plug 6 results in the latter being non-rotatably connected to sleeve 4 in a formfit and/or frictional fit. This results in disk-shaped head portion 7 being rotated relative to injection-moulded member 10 on pivotal movements of trailing wheel 1 about the upright axis.

The locking device itself comprises a flange 13 extending in a substantially vertical direction from the top surface of head portion 7 and forming an engagement surface 8 lying in a substantially vertical plane. Adjacent head portion 7, the upper surface of injection-moulded member 10 is provided with a pair of substantially vertically extending parallel lugs 11 defining a groove 12 therebetween. A rod member 17 having a substantially circular cross-sectional shape and forming a part of a locking member 9 is adapted to be press-fitted into groove 12 from above, the resiliency of lugs 11 and the dimensions of rod member 17 and groove 12 being selected such that after press-fitting rod member 17 into groove 12, locking member 9 is mounted between lugs 11 for pivotal movement about a horizontal axis and retained thereby, so that considerable force is required for withdrawing it from groove 12.

Figure 2:
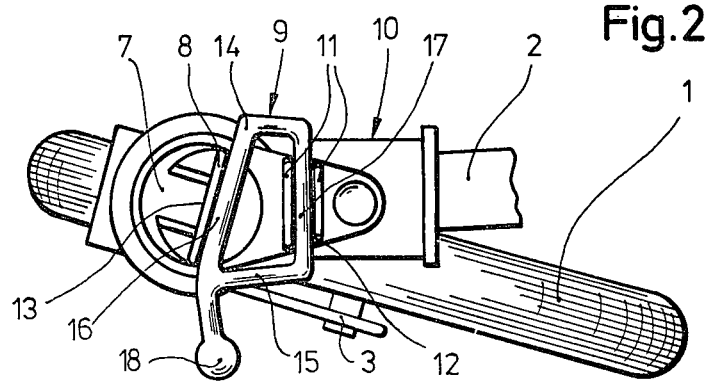
FIG. 2 shows a top plan view of the locking device of FIG. 1.

As clearly shown in FIG. 2, locking member 9 comprises a further rod member 16 connected to first rod member 17 by lateral rod members 14, 15, said further rod member 16 being adapted on pivoting locking member 9 into a substantially horizontal plane to engage vertical engagement surface 8. As also clearly evident from FIG. 2, trailing wheel 1 is prevented from pivoting about the upright axis in the locking position. Integrally formed with locking member 9 is a grip portion 18 by means of which locking member 9 is readily pivoted into and out of the locking position.

As also shown in FIG. 2, rod members 14 to 17 of locking member 9 are arranged in a trapezoidal configuration in this embodiment. This is due to the fact that the strut of carriage 2, to which injection-moulded member 10 is attached, does not extend in the longitudinal direction of the frame, i.e. in the straight-running direction, but at an angle thereto.

The rod members of locking member 9 may of course also be arranged in a rectangular or any other suitable configuration if trailing wheel 1 in its straight-running position is aligned with the strut 2 of carriage 2 or assumes any other angular position with respect thereto. Although in the embodiment shown, engagement surface 8 and locking member 9, or groove 12, respectively, are located substantially behind one another in the direction of travel, this represents only one of several possible arrangements. The named parts of the locking device may of course also be arranged side-by-side in the transverse direction of the carriage, provided they are still capable of achieving the reliable locking action aimed at by the invention. With a view to structurally simple and cost-effective manufacture, member 10, plug 6 and locking member 9 are preferably formed as injection-moulded members.

I claim:

1. In a locking device for locking a trailing wheel of a wheeled carriage in a straight-running position, said trailing wheel having an axis of rotation and being mounted for pivotal steering movement about a vertical axis extending perpendicular to the axis of rotation, but not intersecting it, wherein a support member carrying the axis of rotation of the trailing wheel is connected to a vertically extending sleeve mounted for rotation about the vertical axis in a concentrically surrounding cylindrical recess in the wheeled carriage, and wherein a resiliently deformable plug, extending through said recess from above and having a disk-shaped enlarged head portion engaging a rim of an upper end face of said recess, is non-rotatably connected to said sleeve, the improvement comprising a substantially vertically extending engagement surface formed on said disk-shaped head portion of the plug and a locking member pivotally mounted on the wheeled carriage for positive locking engagement with the engagement surface to thereby lock the wheel against pivotal movement about the vertical axis.

2. The locking device of claim 1, wherein said cylindrical recess is formed in an injection-molded member adapted to be connected to said wheeled carriage, the upper surface of said molded member adjacent said recess being formed with two integrally injection-molded lugs defining an upwards opening groove having a longitudinal axis and adapted to receive said locking member in a pressure fit, so that said locking member is resiliently retained by said lugs for pivotal movement about a substantially horizontal axis aligned with the longitudinal axis of said groove.

3. The locking of claim 1 or 2, in which the engagement surface is formed on a vertically extending flange formed integral with said head portion of said plug.

4. The locking device of claim 1 or 2, in which said locking member comprises two rod members of generally circular cross-sectional shape connected to one another in spaced relationship by substantially parallel extending lateral rods, one of said rod members being mounted in said groove while the other engages said engagement surface in locking position, and a grip portion for pivoting said locking member into and out of its locking position.

5. The locking device of claim 4, wherein said locking member is injection-molded.

* * * * *